No. 666,652. Patented Jan. 29, 1901.
F. B. DICKINSON.
PHOTOGRAPHIC CAMERA.
(Application filed Apr. 19, 1899.)

(No Model.)

WITNESSES
James F. Duhamel
Robert C. Morgan

INVENTOR
Frederic B. Dickinson
BY
Fred E. Tasker
ATTORNEY

THE NORRIS PETERS CO., PHOTO-LITHO., WASHINGTON, D. C.

UNITED STATES PATENT OFFICE.

FREDERIC BILLINGS DICKINSON, OF CHATTANOOGA, TENNESSEE.

PHOTOGRAPHIC CAMERA.

SPECIFICATION forming part of Letters Patent No. 666,652, dated January 29, 1901.

Application filed April 19, 1899. Serial No. 713,606. (No model.)

*To all whom it may concern:*

Be it known that I, FREDERIC BILLINGS DICKINSON, a citizen of the United States, residing at Chattanooga, in the county of Hamilton and State of Tennessee, have invented certain new and useful Improvements in Photographic Cameras; and I do hereby declare the following to be a full, clear, and exact description of the invention, such as will enable others skilled in the art to which it appertains to make and use the same.

My present invention has reference to stereoscopic photography. Its objects, among others, are to adapt a one-lens camera to the uses of a stereoscopic camera and to combine in one camera the essential features of the two kinds, so that a one-lens camera may be used quickly for either purpose at the will of the operator without increasing its bulkiness or weight or impairing its efficiency and with little expense.

The invention consists, essentially, of a skeleton slide or false shield used in combination with a movable or sliding front or lens board to produce a stereoscopic negative and also in a modification of a tripod-top or table adapted and intended to be used in conjunction with a small camera for the purpose of producing a stereoscopic negative; and the invention may also be said to comprise numerous details and peculiarities in the construction and combination of the various parts, substantially as will be hereinafter described and claimed.

Figure 1:
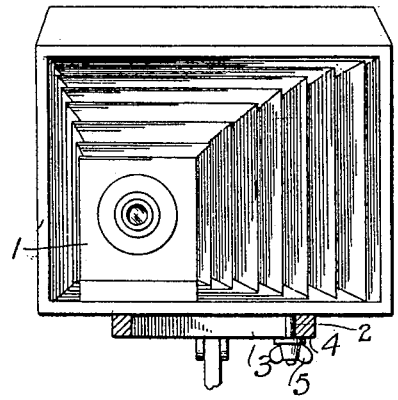
Figure 2:
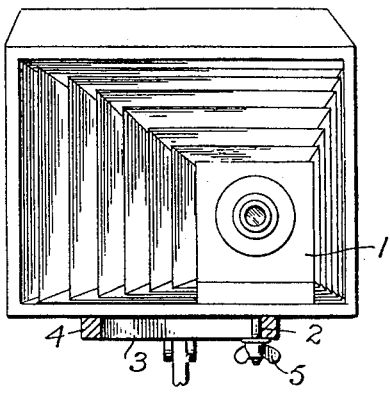
Figure 3:
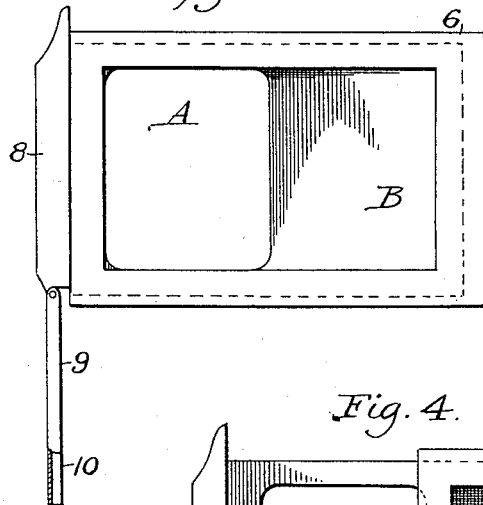
Figure 5:
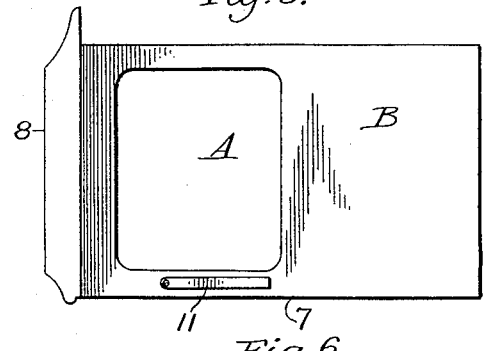
Figure 6:
Figure 4:
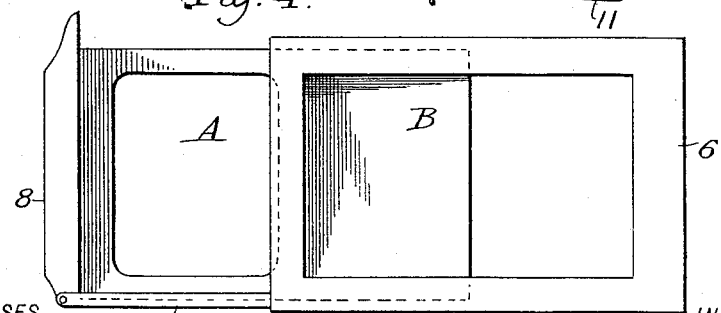
Figure 7:
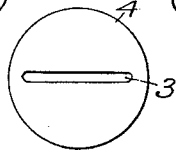

In the annexed drawings, illustrating my invention, Figures 1 and 2 are front views of a camera, showing the lens-front pushed or adjusted to the right and left, respectively, so as to correspond to the positions of the human eyes when viewing the same object. Fig. 3 represents a side elevation of a plate-holder and skeleton slide inserted therein, the latter being shown in its innermost position, which is one of the two positions which it is intended to occupy in carrying out the purposes of my present improvements. Fig. 4 is a similar view in elevation of the plate-holder and the skeleton slide, the latter being shown with its skeleton portion projecting from the holder—that is to say, in its outermost position—which is the other of the two positions that it is intended to occupy in its practical operation with the holder. Fig. 5 is a detail view of the said holder-slide, indicating that a portion of the material thereof has been removed at one point to provide an opening therethrough and showing a modified form of stop. Fig. 6 is an edge view of the slide shown in Fig. 5 and its stop. Fig. 7 is a plan view of a tripod-top or table having therein a transverse slot adapted to receive the fastening carrying the camera.

Like characters of reference designate corresponding parts throughout the different figures of the drawings.

1 denotes the lens-front of a camera constructed very much after the usual way and carrying some suitable lens, said lens-front being arranged in conjunction with the appurtenant parts of a camera, which is shown here simply by way of illustration in order to practically explain the construction and operation of my invention. Sometimes when it is desired to secure a small camera to a tripod-top the camera or a sliding part of the tripod may be provided with a downwardly-projecting bolt 2, which passes through a slot 3 in the tripod-top or table 4 on which the camera is supported, said bolt or rod 2 being adjustable within the slot 3 from end to end thereof and being provided with a thumb-nut 5, applied to the screw-threaded end of the bolt 2 and acting as a clamp against the under side of the table 4 for the purpose of tightly and effectually clamping the camera in whatever position of adjustment it may occupy. Thus it will be seen that the camera may be shifted quickly from a position at one end of the slot 3 to a position at the opposite end of said slot and held fixedly by the clamping device in either position.

6 designates a plate-holder of the ordinary construction, having at one end thereof the usual slot or aperture, through which the slide is inserted thereinto. The slide which I employ in my present invention is indicated by the reference-numeral 7. It has a finger-hold 8 and is of a skeleton form, there being in one half-section thereof a rectangular or other-shaped aperture. A denotes this opening in the skeleton half of the slide, and B the remaining solid or integral portion of the slide.

My improved plate-holder slide is preferably provided with a stop device which will hold it in a position where one half of the slide will be within the holder 6 and the other half outside of the holder. Said stop is susceptible of a variety of forms, and in the drawings I have shown two by way of example—one being shown in Figs. 3 and 4 and the other in Figs. 5 and 6. That in Figs. 3 and 4 is, perhaps, a preferable form. It consists of a strip 9, of wood, metal, or other material of the required length, (which is about half the length of the slide,) and is pivoted or hinged to the finger-hold 8 at one end thereof to enable it to be swung into the position shown in Fig. 3, where it is out of the way, or to be moved in contact with the adjoining edge of the slide 7. Its edge nearest the edge of the slide is longitudinally grooved or channeled from end to end, as at 10, to permit it to fit easily over the edge of the slide, whereby in use this stop-arm rests astride of the edge of the slide, as is shown in Fig. 4, where it serves the double purpose of affording an additional support to the slide and also as a stop, the end of which comes in contact with the edge of the plate-holder 7, as shown in Fig. 4, to mark the proper position of the slide when inserted into the holder 6.

Another form of stop for the slide is represented in Figs. 5 and 6, the same consisting of a flat spring 11. This spring 11 consists of a short piece of metal which is embedded or set into a recess or slot 12 in the slide 7, being secured therein by means of a screw or other fastening device, the heel of the spring being toward the finger-hold 8, while its toe projects from the recess 12 into a position where it will strike against the edge of the holder when the slide is being inserted thereinto, and thus will arrest the slide at the desired point, said spring 11 being so arranged that when compressed against the slide and into the recess 12 it will enter and pass through the slide-aperture in the end of the plate-holder, and thereby allow the slide to which it is attached to be inserted into the holder or withdrawn therefrom without injury.

Other forms of stop than the two delineated and described herein may be employed in lieu of either of these, if preferred, it being only essential that the stop should be so related to the slide that it will have the function of stopping the entrance of the slide into the holder at such a point as will leave half of the film or plate exposed, while the other half is covered by the solid portion B of the slide.

The opening A in the slide 7 admits an exposure on a certain portion of the photographic plate or film, while the remainder thereof is shielded by the solid part B. The object of this arrangement, as well as of the adjustable connection of the lens-front, is to permit the making of two exposures with the camera in quick succession in order to produce a stereoscopic negative.

The operation is as follows: The camera will first be adjusted in the usual manner. The lens-front 1, carrying the lens, will then be moved horizontally about one and five-eighths inches from its normal position in the center, either to the right or left hand, preferably to the left first, conforming to the position of the left eye, as shown in Fig. 2. It is advisable to place a stop at the proper point when determined, so that the exact limit may always be reached quickly without examination, and I reserve the liberty of locating such stop of any desired kind wherever it may be needed. The dark slide will now be withdrawn from the plate-holder and my improved skeleton slide inserted therein until arrested by the slide-stop, the end of which will strike against the edge of the slide-aperture in the holder, as already described, said position of the slide relatively to the holder being illustrated in Fig. 4, in which the solid half B of the slide shields the plate or film, excepting that portion which is left uncovered to receive the exposure. The first exposure is then given. Next the lens-front 1 is moved horizontally about three and one-fourth inches to the right, (and about one and five-eighths inches from the center on the other side,) thus conforming to the position of the right eye. The skeleton slide is then pushed entirely into the holder 6, the stop 9 or 11, as the case may be, being first removed to permit such movement of the slide. The result of this movement will be to place the opening A opposite the lens, while the solid part B will shield that portion of the plate or film previously exposed. The second and equivalent exposure will then be given. The skeleton slide is now withdrawn and the dark slide reinserted. The lens-front 1 should then be restored to its central normal position. The operation which I have just described presupposes a camera using a plate or film about five by seven inches or larger and will produce a stereoscopic negative on one plate or film with its two pictures in close proximity or even touching one another and without the vacant space usual in negatives made with a stereoscopic camera. This is an advantage both when developing a negative and also when printing from it, as it will save material.

In order to produce a stereoscopic negative with a small camera using a plate too short to permit two independent exposures, the operation will require two plates or films. In such operation, after having adjusted the camera in the usual way with the tripod-screw or fastening inserted through the slot 3 and taking care that the slot 3 shall be at about right angles to the line of vision, the camera will first be pushed to one end of the slot and secured and the exposure given in the usual manner or, say, in the manner usual with one plate or film. The camera will then be pushed to the other end of the slot and secured, care being taken to present the same view as in the previous exposure. The second and equivalent exposure will then be given upon a second plate or film. These two plates or films will produce one complete stereoscopic negative.

Having thus described my invention, what I claim as new, and desire to secure by Letters Patent, is—

1. The combination with a plate-holder, of a slide having an aperture formed therein and provided with a stop for governing the position of the slide in the holder during the production of a stereoscopic negative.

2. The combination with a plate-holder, of a skeleton slide having an opening for the purpose of admitting exposure on a portion of the film, while the rest is shielded, and a stop for governing the position of the slide in the holder.

3. The combination with a plate or film holder, of a slide having an apertured portion, and a hinged stop on said slide formed with a grooved edge that fits over the adjoining edge of the slide.

In testimony whereof I affix my signature in presence of two witnesses.

FREDERIC BILLINGS DICKINSON.

Witnesses:
JAMES M. RICHARD,
A. C. BIESE.